US012108114B2

(12) United States Patent
Aher et al.

(10) Patent No.: US 12,108,114 B2
(45) Date of Patent: Oct. 1, 2024

(54) SYSTEMS AND METHODS FOR GENERATING DYNAMIC ANNOTATIONS

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 18/104,931

(22) Filed: Feb. 2, 2023

(65) Prior Publication Data
US 2023/0269429 A1    Aug. 24, 2023

Related U.S. Application Data

(63) Continuation of application No. 16/803,740, filed on Feb. 27, 2020, now Pat. No. 11,606,613.

(51) Int. Cl.
*H04N 21/462* (2011.01)
*G06F 40/295* (2020.01)
*H04N 21/431* (2011.01)
*H04N 21/45* (2011.01)
*H04N 21/81* (2011.01)

(52) U.S. Cl.
CPC ......... *H04N 21/462* (2013.01); *G06F 40/295* (2020.01); *H04N 21/4316* (2013.01); *H04N 21/4532* (2013.01); *H04N 21/8133* (2013.01)

(58) Field of Classification Search
CPC ............. H04N 21/462; H04N 21/4316; H04N 21/4532; H04N 21/8133; G06F 40/295
See application file for complete search history.

(56) References Cited

U.S. PATENT DOCUMENTS

| 9,571,890 | B1* | 2/2017 | Diamondstein .... H04N 21/2387 |
| 9,767,087 | B1 | 9/2017 | Petrov |
| 10,063,910 | B1 | 8/2018 | Yelton et al. |
| 10,122,669 | B1 | 11/2018 | Lewis et al. |
| 11,128,910 | B1 | 9/2021 | Aher et al. |
| 11,606,613 | B2 | 3/2023 | Aher et al. |
| 2008/0178125 | A1 | 7/2008 | Elsbree et al. |

(Continued)

OTHER PUBLICATIONS

PCT International Search Report and Written Opinion for International Application No. PCTUS2020066936, dated Apr. 9, 2021.

*Primary Examiner* — Randy A Flynn
(74) *Attorney, Agent, or Firm* — HALEY GUILIANO LLP

(57) ABSTRACT

A system for managing media content annotations is configured to generate annotations having a format similar to a title and tailored to a user profile. The system identifies a media content item and identifies a user entity. The system selects from among a plurality of annotations linked to the media content item and stored in metadata. For example, the system may generate more than one annotation, generate links between each annotation and user profile information, and then select among the annotations for the most appropriate annotation for a given user. The annotation may include keywords or entities that are included in, linked to, or otherwise associated with the user profile information. The system outputs, or generates for output, a display that includes a representation of the media content item and the selected annotation.

18 Claims, 8 Drawing Sheets

(56) References Cited

U.S. PATENT DOCUMENTS

| | | |
|---|---|---|
| 2011/0047163 A1 | 2/2011 | Chechik et al. |
| 2013/0067333 A1 | 3/2013 | Brenneman |
| 2015/0169525 A1 | 6/2015 | Palm et al. |
| 2016/0007098 A1 | 1/2016 | Southam et al. |
| 2016/0210665 A1 | 7/2016 | Champy |
| 2017/0109340 A1 | 4/2017 | Chen et al. |
| 2017/0329872 A1* | 11/2017 | Dispensa .................. G06F 7/08 |
| 2017/0366859 A1 | 12/2017 | Chimayan et al. |
| 2019/0124403 A1* | 4/2019 | Favicchio ............ H04N 21/431 |
| 2020/0084519 A1 | 3/2020 | Pappu et al. |
| 2020/0210467 A1 | 7/2020 | Ravindran et al. |
| 2021/0274240 A1 | 9/2021 | Aher et al. |
| 2021/0274255 A1 | 9/2021 | Aher et al. |

* cited by examiner

SYSTEMS AND METHODS FOR GENERATING DYNAMIC ANNOTATIONS

CROSS-REFERENCE TO RELATED APPLICATIONS

This application is a continuation of U.S. patent application Ser. No. 16/803,740, filed Feb. 27, 2020, the disclosure of which is hereby incorporated by reference herein in its entirety.

BACKGROUND

The present disclosure relates to systems for generating dynamic annotations, and, more particularly, systems for generating dynamic annotations based on user information and content information.

SUMMARY

In media platforms, such as video hosting platforms, interfaces for the platforms typically display thumbnail representations of the media. For example, referencing a video, the representation may include a still image of a particular video frame of the video. The representation generally needs to be informative, representative content-wise, and attractive to generate user interest. Accompanying a title with the representation is one approach to describe media content to the user. Relying on the title alone, however, may not indicate to a user that media content may be contain relevant information or topics to the user. In such a case, the user may skip over or ignore viewing the media content without knowing that the media content may be of interest to the user.

The present disclosure describes systems and methods that generate annotations corresponding to media content. The system generates an annotation for a media content item by identifying a title of the item and determining the form of the title. For example, the system may generate a template that captures the structure of the title. The system then generates an annotation using the template and on user profile information for one or more users. For example, the system identifies entities or other information that may be relevant to or of interest to a user and generates an annotation with that information. The annotation has the same form as the title of the media content item for consistency and is linked to the media content item. The linked annotation with the media content item can also be connected or linked to one or more users based on user profile information. The system may generate more than one annotation, and then select from among those annotations to provide the most relevant annotation to the user. Accordingly, a plurality of annotations may be generated based on the media content item, and may be stored for retrieval bases on which user profile information is applied. The annotations may be overlaid or otherwise displayed with the representation of the media content item on a display. The annotations are also dynamic that can be changed and linked or modified for one more users.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure is directed to systems and methods that generates and manages annotations corresponding to media content, and more particularly, systems that generate and display annotations with media content representations that are of interest to a user. While videos are used to describe embodiments of the present disclosure, the techniques of the present disclosure may be applied to any suitable media content item. The following embodiments provide improvements to computing systems displaying media content with title information by providing annotations that are linked to the media content and tied to one or more users such that the annotations are relevant to the user based on user profile information. In this way, in view of the linked annotations, a user may access or view media content interesting to the user even if the title of the media may not indicate so.

Figure 1:
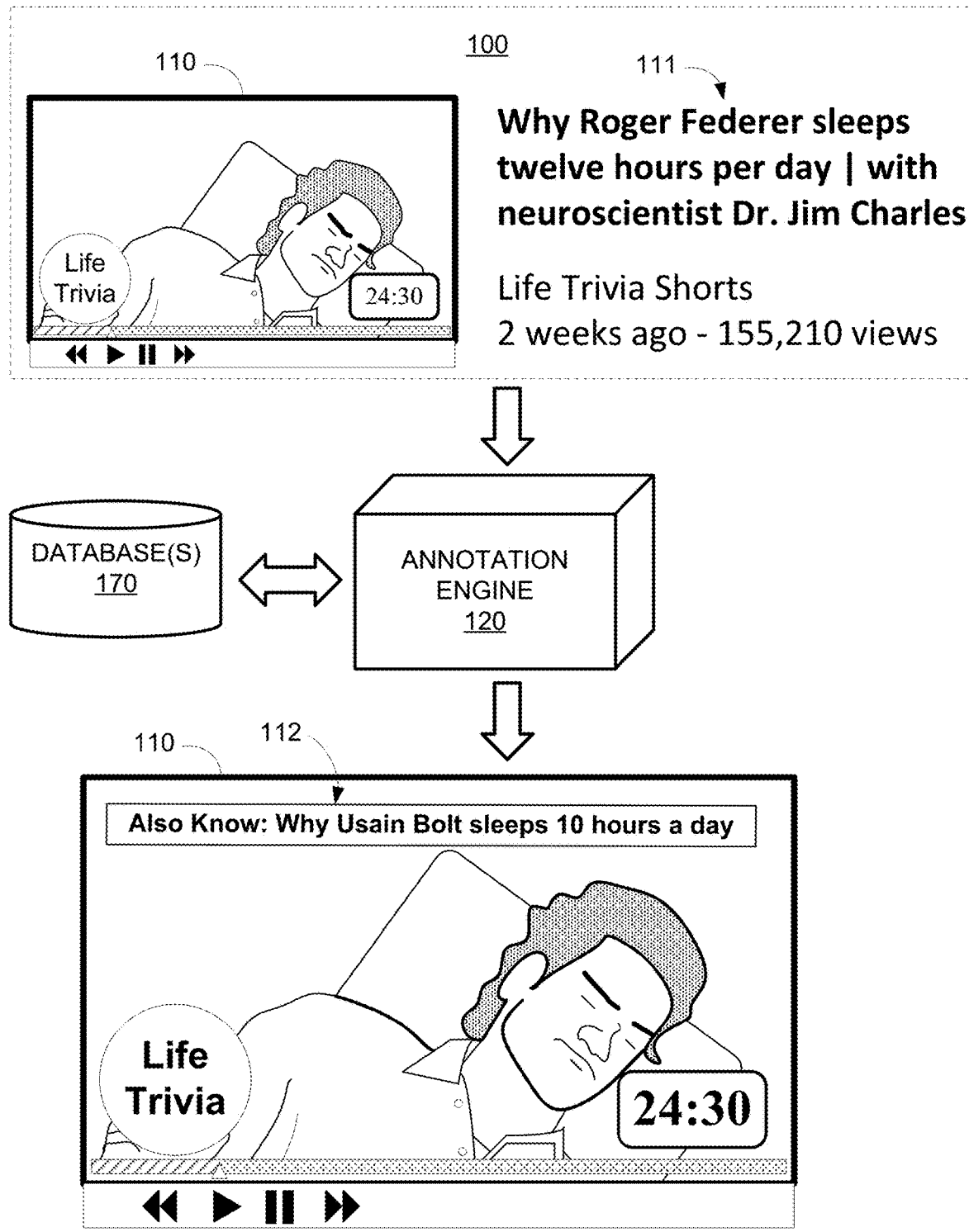
FIG. 1 shows a block diagram of an illustrative system for generating an annotation, in accordance with one embodiment.
Figure 4:
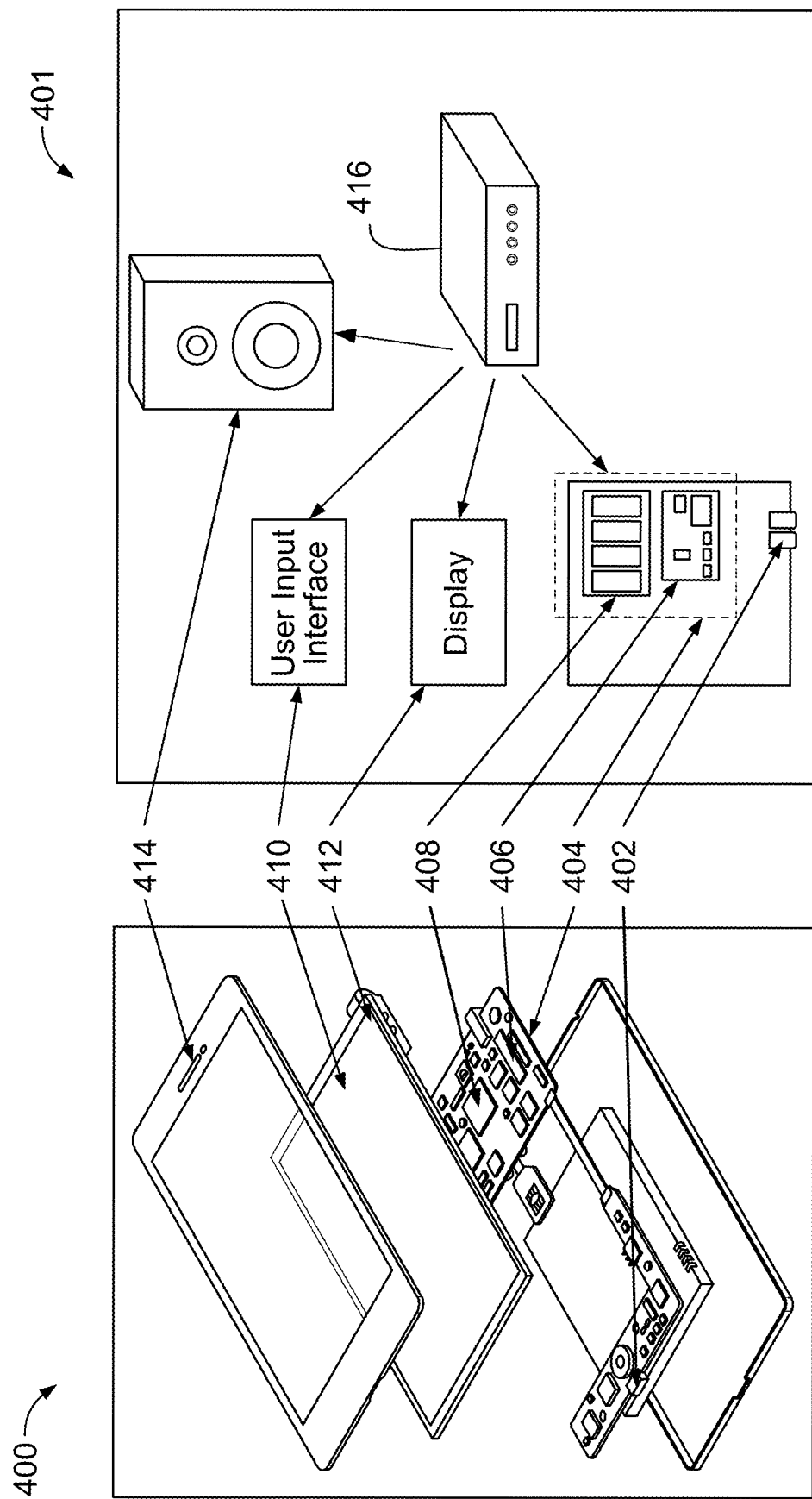
FIG. 4 is a block diagram of an illustrative user device, in accordance with one embodiment.
Figure 5:
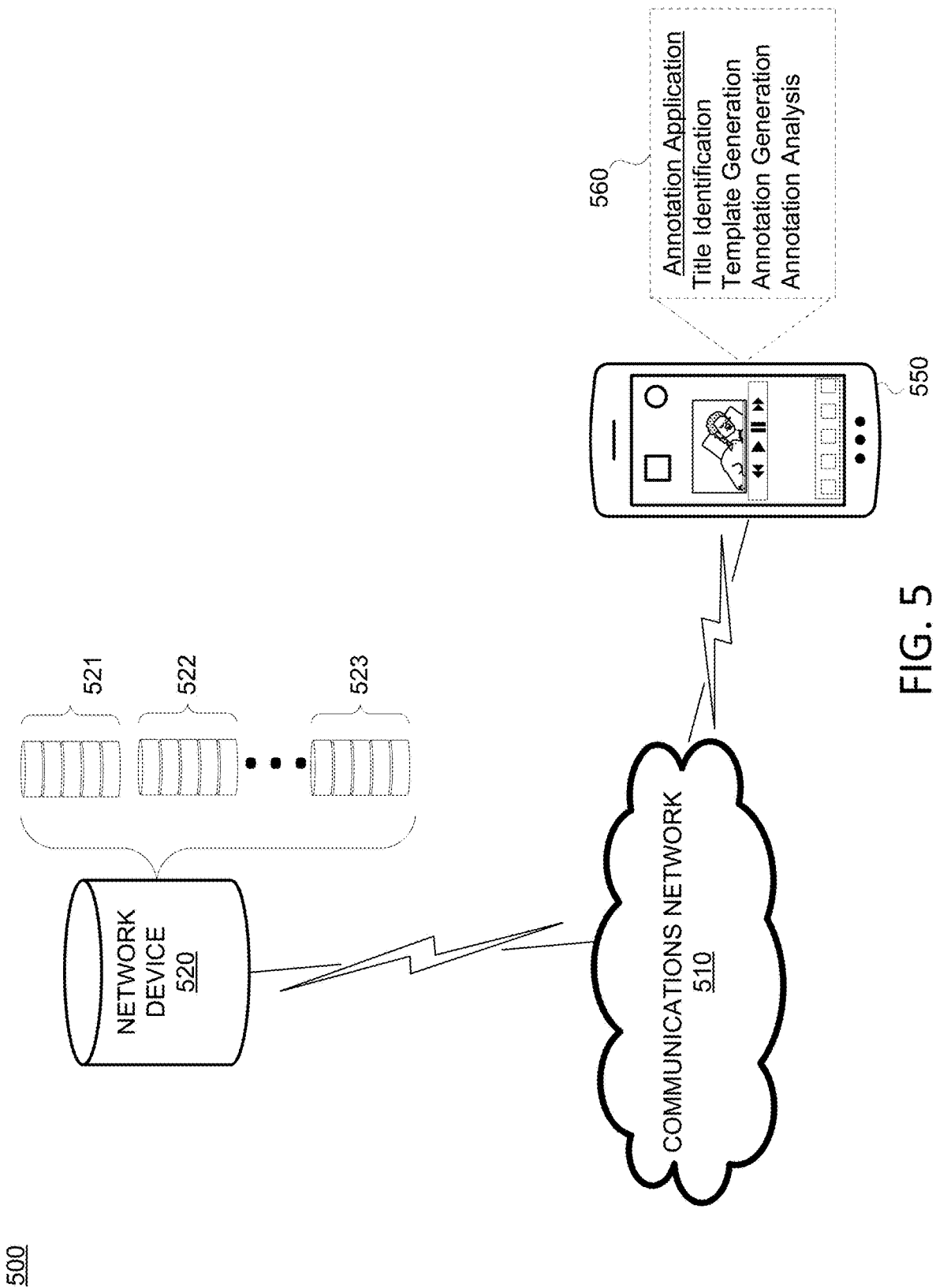
FIG. 5 shows a block diagram of an illustrative system for generating and outputting an annotation, in accordance with one embodiment.

FIG. 1 shows a block diagram of an illustrative system for generating an annotation according to one embodiment. The system, as illustrated, includes annotation engine 120 which retrieves information from, and transmits information to, one or more databases 170. Annotation engine 120 may include an application or platform, implemented on any suitable hardware such as a user device, a user equipment system, a network device, any other suitable device, or any combination thereof (e.g., as illustrated in FIGS. 4-5). Interface 100 can provide an interface or application with a thumbnail 110. In this example, thumbnail 110 is a still image from a video frame having title information 111, e.g., the title "Why Roger Federer sleeps twelve hours per day|with neuroscientist Dr. Jim Charles." Title information 111 also includes information about which entity posted the video (e.g., "*Life Trivia Shorts*"), when the video was posted (e.g., "2 weeks ago") and how many times the video has been viewed (e.g., "155,210 views"). To illustrate, a media platform such as a video streaming service may display a plurality of representations of corresponding media content items for a user to navigate among and select for viewing using an interface or application on a client device. Interface 100 may be, accordingly, one part of a larger display that includes a plurality of displays similar to interface 100 that are arranged in a list, array, or other configuration that may be navigated by the user. In other examples, interface 100 is part of a user device, e.g., a mobile, laptop, or desktop computing device. Interface 100 may include a visual interface generated by a media content platform or other suitable platform, and configured to be displayed on a display.

For one embodiment, annotation engine 120 identifies the media content item (e.g., thumbnail 110) and the title (e.g. title 111) thereof. As illustrated, annotation engine 120 identifies the video clip and the title referencing Roger Federer. Annotation engine 120 retrieves or otherwise accesses metadata associated with the video clip and may identity the title based on the metadata (e.g., a string of text having a "title" tag). For example, annotation engine 120 may retrieve content, metadata, or both from one or more databases 170. Annotation engine 120 is configured to generate one or more annotations based on the available textual metadata of the video, which may include, for example, closed captions, descriptions and other text related to the video. Annotation engine can be any combination of hardware and or software modules operating within a computing device such as, e.g., user device 400 as shown in FIG. 4.

In an illustrative example, annotation engine 120 generates an annotation that has some relevance or interest to the expected or intended user (e.g. the annotation is not a random statement from the textual metadata). In some embodiments, annotation engine 120 generates annotations which are similar in form, substance, or both to the title of the video. By using the title as a reference for the format and data from the content, metadata or both, the generated annotation is more likely to represent the content of the video and thus not mislead the user. For example, annotation engine 120 may verify that any entities included in generated annotations provide similar coverage in range as of those entities included in the title of the video. Annotations generated by annotation engine 120 may, in some circumstances, only appeal to certain users and thus the annotation should be displayed only for those users. In some embodiments, annotation engine 120 matches the entities present in the annotation with the user's profile (e.g., stored in one or more databases 170) and displays the annotation to only those users for which a match is identified.

As illustrated, thumbnail 110 is associated with a video clip about the sleeping habits of athletes. The title reference one athlete in particular, who may be popular with a wide audience or a particular audience. However, other athletes featured in, or mentioned in, the video may be of more interest to some users. Annotation engine 120 identifies the other entities of the video (e.g., athletes or celebrities in the illustrated example) that may be of interest, as well as a format for the annotation that is similar to the existing title of the video. Annotation engine 120 identifies Usain Bolt as an entity featured in the video, having a type of "athlete" or a connection to "athlete" in a knowledge graph. Annotation engine 120 accesses user profile information (e.g., of one or more databases 170) to identify entities associated with the user. Because annotation engine 120 has identified Usain Bolt as being associated with the user profile information (e.g., based on the user's viewing history or favorite videos, or user preferences), annotation engine 120 has generated annotation 112 similar in format to the title, but referencing "*Usain Bolt*" instead.

Figure 2:
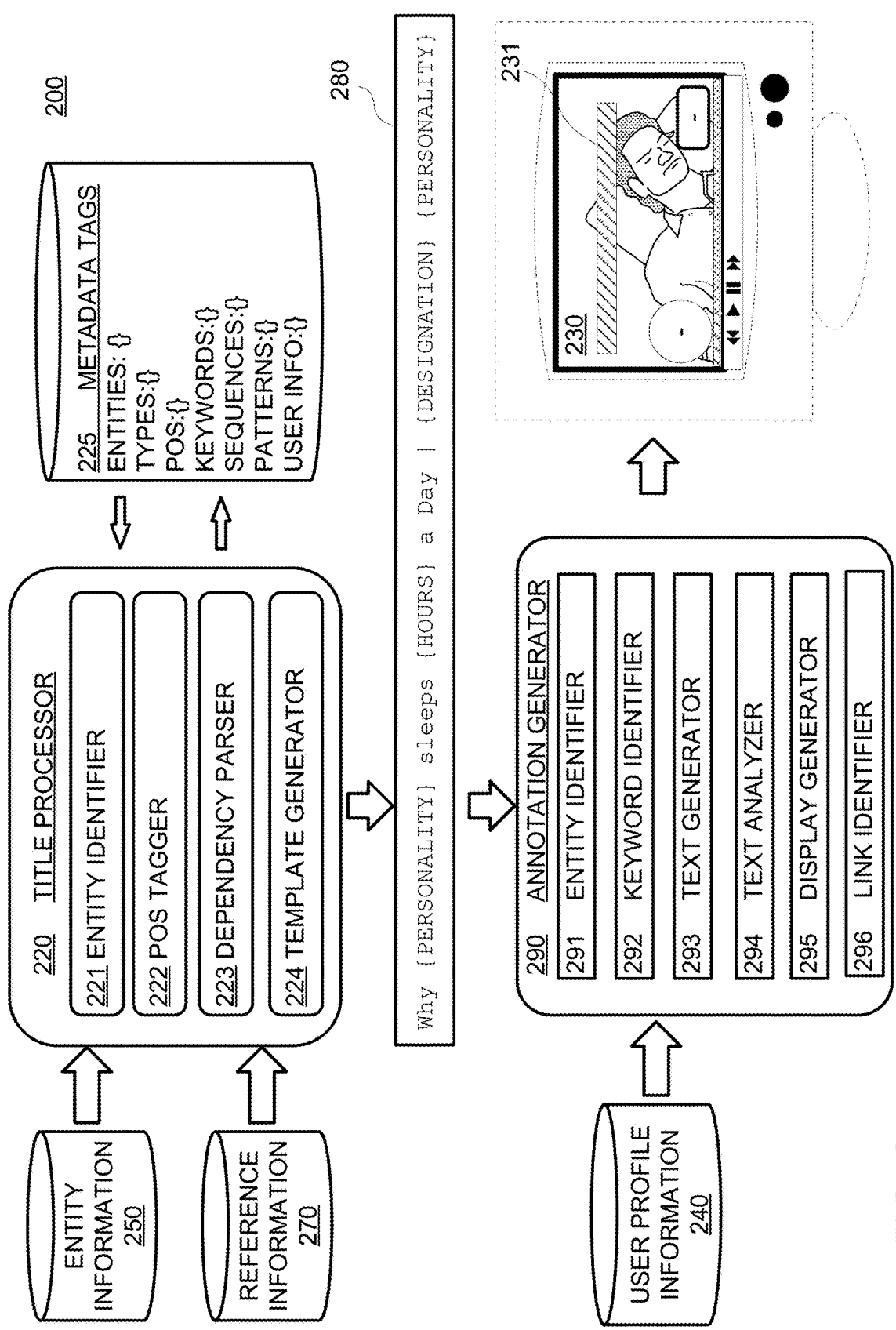
FIG. 2 shows a block diagram of an illustrative system for generating an annotation based on user profile information and a title template, in accordance with one embodiment.

FIG. 2 shows a block diagram of illustrative system 200 for generating an annotation based on user profile information and a title template, in accordance with some embodiments of the present disclosure. As illustrated, system 200 includes title processor 220, annotation generator 290, entity information 250, user profile information 240, and reference information 270. Title processor 220, annotation generator 290, or both, may include an application or platform, implemented on any suitable hardware such as a user device, a user equipment system, a network device, any other suitable device, or any combination thereof (e.g., as illustrated in FIGS. 4-5). For example, a user may access a media platform, which may manage the display of one or more media content items, and thumbnail representations thereof. The media platform may include or access system 200. Title processor 220 identifies a title associated with the media content item (or each media content item) and generates a title template based on the title (e.g., title template 280 as illustrated). Annotation generator 290 uses the title template (e.g., title template 280) and user profile information 240 to generate an annotation (e.g., annotation 231). The annotation may be displayed as an overlay on the thumbnail representation, as illustrated by interface 230 (e.g., as illustrated by annotation 231), which may be generated on a display device. The description of FIG. 2 uses a similar example as illustrated in FIG. 1 for purposes of clarity.

As illustrated, title processor 220 includes entity identifier 221, parts of speech (POS) tagger 222, dependency parser 223, and template generator 224. In some embodiments, title processor 220 identifies the title based on a metadata tag stored in metadata associated with the media content item. For example, a video clip may have associated metadata with the tag type "title" and may include a text string corresponding to the title of the video clip. In some embodiments, title processor 220 may access the media content item and determine the title from the content, a filename, an index, any other suitable information, or any combination thereof.

Entity identifier 221 of title processor 220 identifies one or more entities associated with the title of the media content item. In some embodiments, entity identifier 221 compares words of the title against tags associated with nodes of the information graph to identify one or more entities. In some embodiments, title processor 220 may determine context information based on an identified entity, keywords, database identification (e.g., which database likely includes the target information or content), types of content (e.g., by date, genre, title, format), any other suitable information, or any combination thereof. In some embodiments, entity identifier 221 determines a type of the identified entity based on the tags associated with the identified entity. For example, if the identified entity is an actor as indicated by a tag associated with the entity, entity identifier 221 may identify a type "actor."

POS tagger 222 is configured to identify and tag parts of speech in a string of text (e.g., a title). POS tagger 222 may identify, for example, a noun, pronoun, verb, adjective, adverb, determiner, article, preposition, conjunction, interjection, digit, proper noun, compound, or contraction. For example, a string of text may include a sequence of parts of speech of "noun, verb, noun, noun". POS tagger 222 may identify a sequence of parts of speech of the text and tag the part of speech and position index of each word. POS tagger 222 may tag parts of speech of the text based on historical information (e.g., from previous analysis), based on one or more criteria or rules (e.g., using predetermined logic or templates), based on statistical or modeled information (e.g., for a plurality of queries, based on probabilities using a model, based on neural networks), or a combination thereof. For example, POS tagger 222 may, for each word of a string of text, determine the case (e.g., lower case, upper case, first letter capitalized), or it may identify adjacent or included punctuation (e.g., apostrophes, hyphens, accents, commas, slashes, plus signs "+" or star signs "*"), numbers (e.g., spelled out or as digits, or alphanumeric combinations), index position (e.g., first word, second word, last word), possible parts of speech (e.g., a word may be capable of being a noun, verb, adjective, etc.), any other attribute of a word, or any combination thereof. In some embodiments, POS tagger 222 is configured to identify articles in a string of text, to further parse the text. POS tagger 222 may identify articles or determiners such as "a," "the," "some," "every," and "no," determine whether each word has an associated article or determiner, and identifies the word or group of words that is rendered specific or unspecific based on the article.

Dependency parser 223 is configured to identity a first set of words (e.g., head words) that are modified by other words. In some embodiments, dependency parser 223 takes as input parts of speech identified by POS tagger 222 to determine dependencies. In some embodiments, dependency parser 223 generates a dependency tree, linking the words of the text to each other, optionally with a directionality. In some embodiments, dependency parser 223 identifies keywords or features phrases that match, exactly or closely, predetermined types in the text. For example, words such as "reasons," "actors," "Top #," "episode" may be identified by dependency parser 223.

In some embodiments, POS tagger 222, dependency parser 223, or both are configured to label, tag, or otherwise identify patterns of the string of text. In some embodiments, POS tagger 222, dependency parser 223, or both further parses the string of text to generate labeled sequences. In some embodiments, for example, parts of speech determined by POS tagger 222 may be used to assign the labels. In some embodiments, POS tagger 222 and dependency parser 223 are a single module (e.g., a text parsing engine), configured to identify parts of speech or probable parts of speech and use the structure of the text to determine the form of the title template. In some embodiments, title processor 220 or any module thereof is configured for articles tagging, POS tagging, and sequence labeling based on pattern recognition. In some embodiments, title processor 220, or any module thereof, determines groups or sequences of words that are related or otherwise collectively refer to an entity (e.g., "Greatest Hits by Carole King").

Template generator 224 is configured to generate one or more title templates based on analysis of the title by entity identifier 221, POS tagger 222, and dependency parser 223, a reference template (e.g., from reference information 270), historical information (e.g., previous templates, typical title formats, or other information from reference information 270) or a combination thereof. To illustrate in the context of a video, template generator 224 processes the title of the video and creates a template from the title. In some embodiments, template generator 224 generates the title template and stores the title template as part of metadata tags 225. In some embodiments, template generator 224 generates the title template and stores the title template in reference information 270 (e.g., linked to the media content item). In some embodiments, template generator 224 retrieves one or more reference title templates from reference information 270, and selects among the reference title templates to generate the title template.

In an illustrative example, title processor 220, or entity identifier 221, POS tagger 222, dependency parser 223, and template generator 223 thereof, may output metadata tags 225. Metadata tags 225 may include any suitable types of tags that may be associated with entities (e.g., names, places, occupations, things, attributes); types; keywords (e.g., features that are not necessarily entities); sequences (e.g., of words, parts of speech, or phrases); patterns (e.g., of words, parts of speech, or phrases); any other information or features; or any combination thereof. Tags of metadata tags 225 may include text (e.g., letters, words, strings of words, symbols, or combinations thereof), numerical values, or any combinations thereof (e.g., alphanumeric identifiers).

In an illustrative example, title processor 220 analyzes the title using various natural language processing (NLP) tools such as a POS tagger and Dependency parser to extract details from the title and create the title template. As illustrated in FIG. 2, title processor 220 generates title template 280 of the form: "Why {PERSONALITY} sleeps {HOURS} a Day|with {DESIGNATION} {PERSONALITY}."

As illustrated, annotation generator 290 includes entity identifier 291, keyword identifier 292, text generator 293, text analyzer 294, display generator 295, and link identifier 296. Annotation generator 290 is configured to generate annotations based on title template 280, user profile information 240, and analysis thereof.

Entity identifier 291 of annotation generator 290 identifies one or more entities associated with or of interest to the user, as determined from user profile information 240. Entity identifier 291 may be, but need not be, similar to entity identifier 221 of title processor 220. For example, entity identifier 291 and entity identifier 221 may be combined as a single module. In some embodiments, entity identifier 221 compares one or more entities identified in the title (e.g., and types associated with the entities) to entities tagged as part of the user's viewing history, the user's search history, the user's preferences, keywords associated with the user, any other suitable information about the user, or any combination thereof. In some embodiments, annotation generator 290 may determine context information based on an identified entity (e.g., identified by entity identifier 291), keywords, database identification (e.g., which database likely includes the target information or content), types of content (e.g., by date, genre, title, format), user information, any other suitable information, or any combination thereof. In some embodiments, entity identifier 291 determines a type of the identified entity based on the tags associated with the identified entity.

Keyword identifier 292 is configured to identify keywords associated with user profile information 240, the media content item from which title template 280 is generated, metadata tags 225, or a combination thereof. In some embodiments, keyword identifier 292 analyzes title to identify patterns, words, or other elements from which keywords may be identified. In some embodiments, keyword identifier 292 compares words of user profile information against reference words (e.g., a library of known and characterized words) to identify keywords. In some embodiments, keyword identifier, assigns tags indicative of type to each word of suitable information in user profile information 240, and uses the tags to select keywords. To illustrate in the context of a video, keyword identifier 292 analyzes the content of video to extract portions of text that are similar to the title.

Text generator 293 is configured to populate the annotation with text based on title template 280 and keywords identified by keyword identifier 292. Text generator 293 may determine a collection of words, and word order, which make up the annotation. In some embodiments, text generator 293 generates the annotation as a text string, and stores the annotation in memory storage (e.g., with metadata tags 225). To illustrate, text generator 293 replaces the entities in the title with entities included in extracted text to generate the annotation. In the context of a video, text generator 293, keyword identifier 292, entity identifier 291, or a combination thereof find text similar to the title from the video content. The video content may include subtitles, descriptions, and other suitable text related to the video. Annotation generator 290, or modules thereof, process text phrases from the content to identify phrases similar to the title. Annotation generator 290 may use any suitable sentence similarity tools and algorithms to generate an annotation.

Text analyzer 294 is configured to analyze the text generated by text generator 293 to determine if the annotation is relevant, appropriate, and representative. In some embodiments, text generator 293 and text analyzer 294 are combined as a single module. Text analyzer 294 may analyze the generated annotation by comparing the annotation against one or more reference annotations, identifying a relevance score of the annotation with the content of the media content item, performing any other suitable determination, or any combination thereof. To illustrate in the context of a video, text analyzer 294 analyzes whether the annotations is representative of the content of video and stores, selects, or otherwise maintains those annotations that are representative.

Display generator 295 is configured to determine how, where, and when to display the generated annotation. To illustrate in the context of a video, display generator 295 presents the video or a representation thereof to the user and selects an annotation based on the user's profile to display. Display generator 295 may include a video card, a video display controller, a graphics processor, input and output connectors and terminals, a graphics application, a video driver, any other suitable hardware or software, or any combination thereof. In some embodiments, display generator 295 may be, but need not be, implemented on different control circuitry from the rest of annotation generator 290 and title processor 220.

Link identifier 296 is configured to identify links among user profile information, media content items, metadata associated with media content items, any other suitable information, or any combination thereof. In some embodiments, link identifier 296 identifies words or phrases and compares the words or phrases with keywords associated with another information source. For example, system 200 may identify a first media content item and link identifier 296 may identify any linked metadata that includes annotations by using indexed databases, memory locations, hardware or software addresses, filenames, directory specifications, any other suitable information, or any combination thereof. In some embodiments, link identifier 296 generates a link between an annotation (e.g., generated by text generator 293) and user profile information 240.

User profile information 240 may include user identification information (e.g., name, an identifier, address, contact information), user search history (e.g., previous voice queries, previous text queries, previous search results, feedback on previous search results or queries), user viewing or consumption history, user preferences (e.g., search settings, favorite entities, keywords included in more than one query), user likes/dislikes (e.g., entities followed by a user in a social media application, user-inputted information), other users connected to the user (e.g., friends, family members, contacts in a social networking application, contacts stored in a user device), keywords provided by the user or generated based on the user, any other suitable information about a user, or any combination thereof.

In an illustrative example, title processor 220 identifies a media content item and determines a title corresponding to the media content item. Title processor 220 generates title template 280 based on the title and based on metadata tags 225 associated with the media content item. Annotation generator 290 generates annotation 231, which is linked to the media content item, based on title template 280 and based on user profile information 240. Annotation generator 290 generates output that may include a display having a representation of the media content item and the annotation.

Referencing the example of FIG. 1, title processor 220 may identify title text "Why Roger Federer Sleeps Twelve Hours a Day|With Neuroscientist Matthew Walker." Annotation generator 290 may identify text "Usain Bolt sleeps 10 Hours" for comparison. Both the title and the identified text include the same verb, each contain a person's name, and each include a time duration. Further, annotation generator 290 may determine that the placing of each type of entity is similar between the title and the identified text. To illustrate, at the metadata level, annotation generator 290 may determine that Roger Federer and Usain Bolt are strongly connected as both are famous sports persons. Thus, annotation generator 290 finds the aspects of the identified text to match corresponding aspects of the title. Annotation generator 290 generates the annotation by replacing the placeholders in the title template (e.g., {personality} and {hours}).

Figure 3:
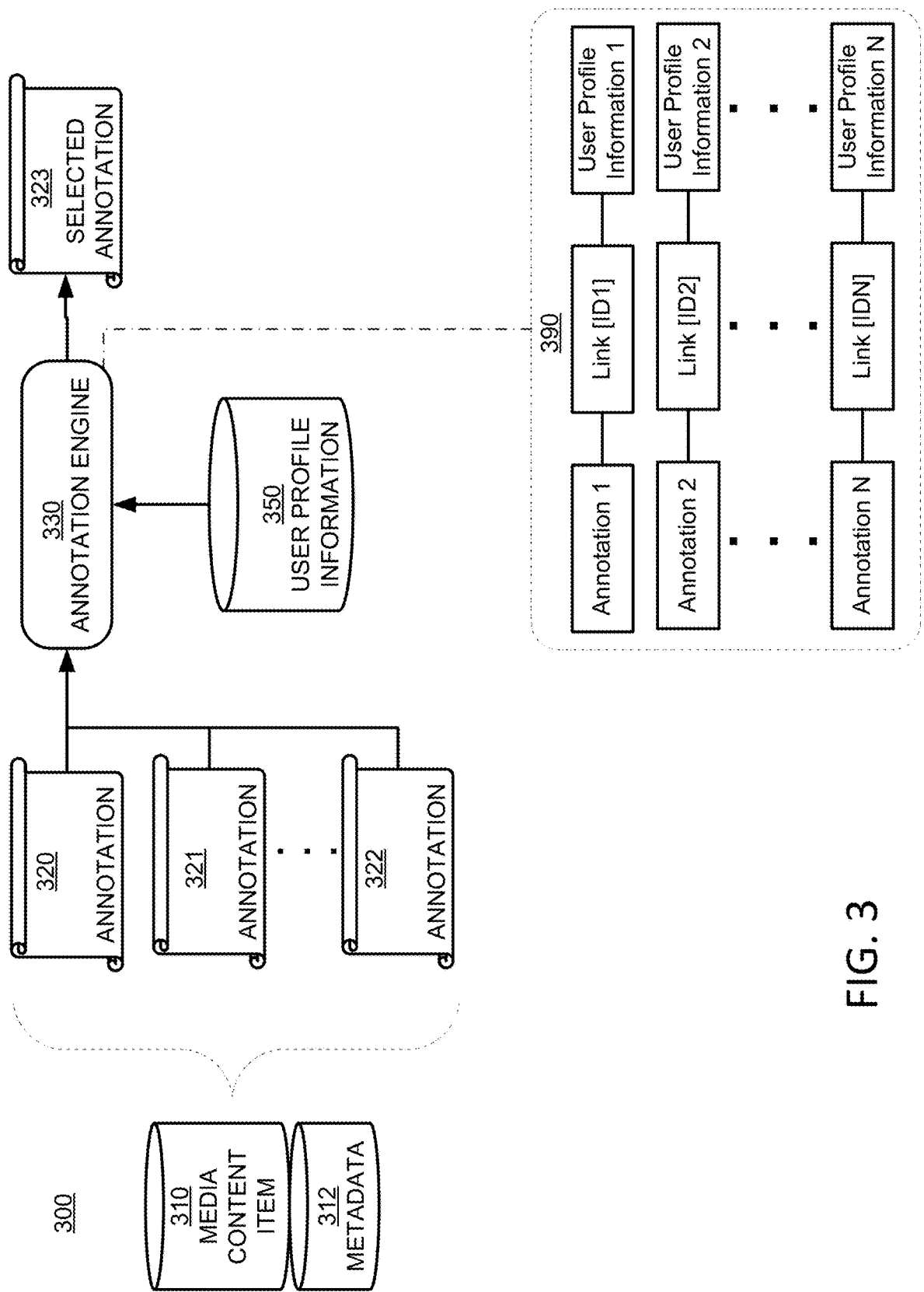
FIG. 3 shows a block diagram of an illustrative system for selecting an annotation based on user profile information, in accordance with one embodiment.
Figure 6:
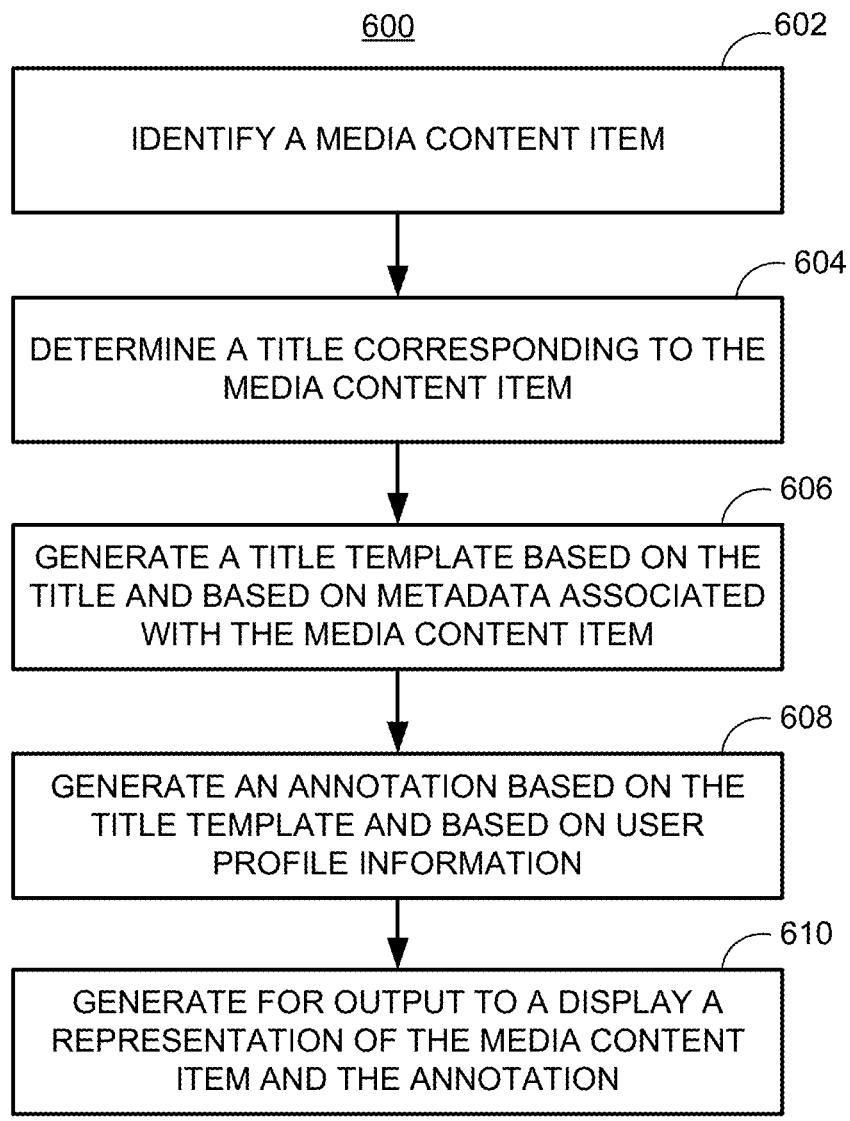
FIG. 6 shows a flowchart of an illustrative process for generating an annotation, in accordance with one embodiment.
Figure 7:
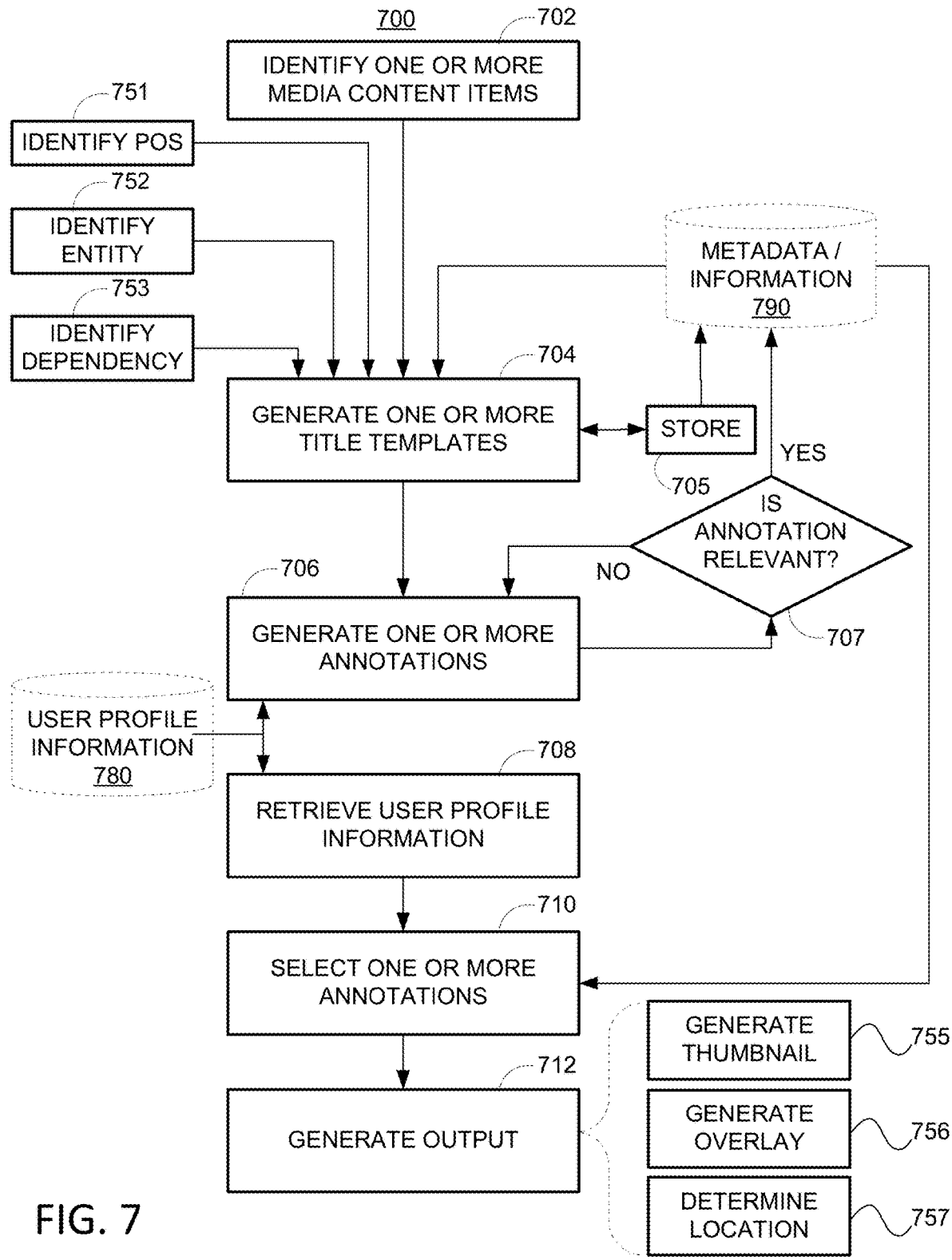
FIG. 7 shows a flowchart of an illustrative process for generating and managing annotations, in accordance with one embodiment.
Figure 8:
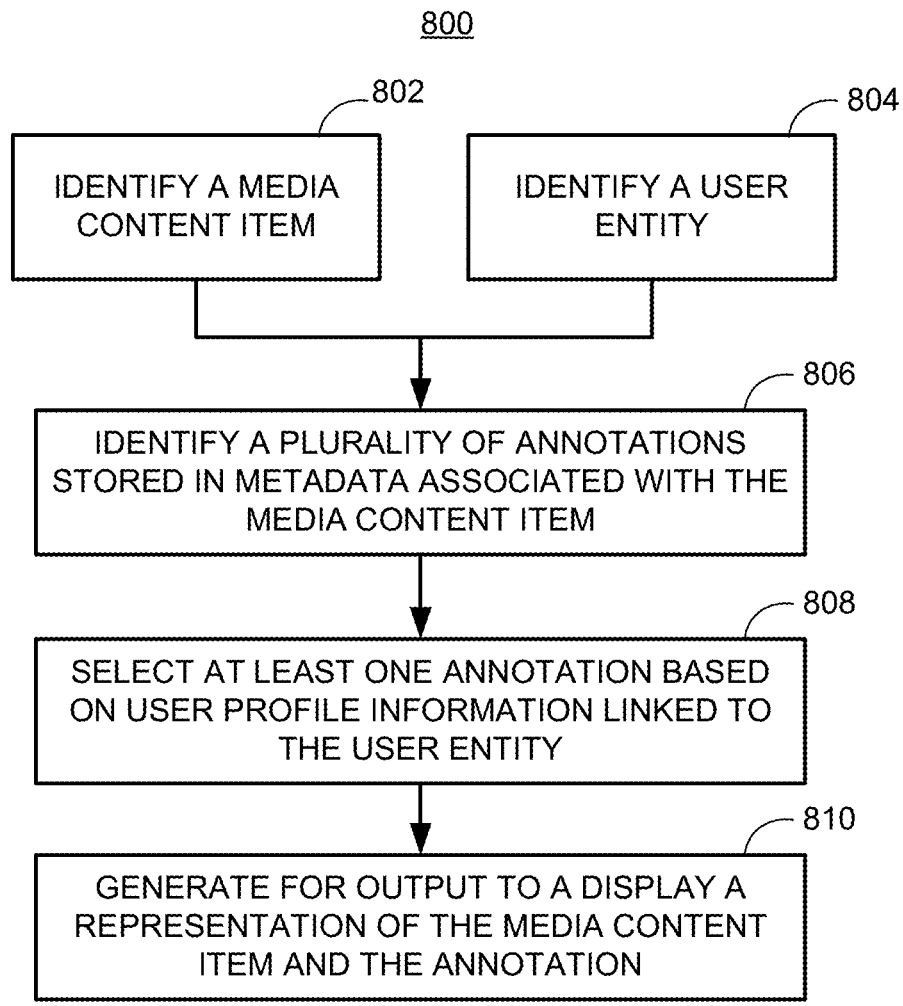
FIG. 8 shows a flowchart of an illustrative process for selecting an annotation, in accordance with one embodiment.

FIG. 3 shows a block diagram of illustrative system 300 for selecting an annotation based on user profile information, in accordance with some embodiments of the present disclosure. System 300, as illustrated, includes media content item 310, metadata 312, annotations 320-322, annotation engine 330, user profile information 350, and selected annotation 323. For example, each of annotations 320, 321, and 322 may be generated by system 200 (e.g., annotation generator 290 thereof), generated by another system, stored in any suitable database or storage, or a combination thereof. In some embodiments, annotation engine 330 is included as part of, or is the same as, text analyzer 294 of FIG. 2. Annotation engine 330, which may be similar to annotation engine 120 of FIG. 1, may include an application or platform, implemented on any suitable hardware such as a user device, a user equipment system, a network device, any other suitable device, or any combination thereof (e.g., as illustrated in FIGS. 4-5) including operation with software, programs or program code implementing techniques (e.g., as illustrated in FIGS. 6-8).

Annotations 320-322 are generated based on media content item 310 and metadata 312. For example, each of annotations 320-322 may be generated from a title template associated with media content item 310 and include words based on content of media content item 310, metadata 312, or both. For example, annotations 320-322 may include one or more keywords included in content associated with media content item 310, metadata 312 (e.g., associated with media content item 310), or both.

User profile information 350 includes any suitable information pertaining to one or more users, user entities, user accounts, or a combination thereof. In some embodiments, user profile information 350 include statistical information for a plurality of users (e.g., search histories, content consumption histories, consumption patterns), a plurality of entities (e.g., content associated with entities, metadata, static types), or both. For example, user profile information 350 may include information about a plurality of entities including persons, places, objects, events, content items, media content associated with one or more entities, or a combination thereof, and any categorizations thereof.

Annotation engine 330 retrieves, recalls, or otherwise accesses annotations 320-322. For example, annotation engine 330 may first identity media content item 310, and then identify annotations 320-322 stored in metadata 312 associated with media content item 310. Annotation engine 330 selects at least one annotation from annotations 320-322 based on user profile information 350. For example, annotation engine 330 may identify an entity which may be of interest to the user (e.g., based on user profile information 350) and select annotation 323 that is most closely relevant to the identified entity (e.g., directly references the entity, shares common aspects the entity). In some embodiments, annotation engine 330 is included as part of system 200, or annotation generator 290 thereof. In some embodiments, annotation 323 is generated for output on a display device (e.g., as an overlay on a representation of media content item 310).

To illustrate, media content item 310 may be a video, the representation of media content item 310 may be a thumbnail image associated with the video, and annotation 323 includes text overlaid on the thumbnail. In some embodiments, annotation engine 330 determines a position on the display to arrange one or more selected annotations.

In some embodiments, user profile information 350 includes keywords, and annotations 320-322 each include one or more words. Annotation engine 330 selects annotation 323 from annotations 320-322 by comparing the one or more keywords to the one or more words. For example, annotation engine 330 may identify entities that are included both in an annotation of annotations 320-322 and information of user profile information 350 corresponding to a suitable user (e.g., the user expected to view the content).

In some embodiments, annotation engine 330 identifies media content item 310 and an entity by identifying the entity based on identifying a user associated with the display device, and receiving input at an input device identifying the media content item. For example, a user may select a representation of a media content item (e.g., media content item 310), and annotation engine 330 may, in response, generate one or more annotations, select one or more annotations from among pre-generated annotations, or both. In some embodiments, user profile information 350 includes a viewing history associated with the user, user preferences, one or more other users the user is linked to, user recommendations, which media content items the user has interacted with, or a combination thereof. In an illustrative example, annotation engine 330 may select annotation 323 from annotations 320-322 by identifying one or more keywords from the information of user profile information 350, identifying one or more words of the plurality of annotations, and comparing the one or more keywords and the one or more words to determine which annotation best matches the one or more keywords.

Annotation engine 330 is configured to link each annotation with user profile information associated with a particular user or group of users. Link information 390, which is in the form of a data structure, illustrates a set of links, each having a unique identifier that links a respective annotation (e.g., of annotations 320-322) to user profile information (e.g., of user profile information 350) associated with a respective user or group of users. In some embodiments, annotation engine 330 stores identifiers (e.g., "ID1," "ID2," and "IDN" as illustrated) in metadata 312, or as information in any other suitable data storage. Accordingly, annotation engine 330 may retrieve annotations or user profile information based on the stored links of link information 390. For example, annotation engine 330 may identify users and association user profile information, and then identify annotations that are linked to those users. In a further example, annotation engine 330 may identify annotations, and then identify users and associated user profile information that is linked to those annotations. The data structure of link information 390 may be of any suitable type, stored on any suitable storage.

In some embodiments, annotation engine 330 determines whether input is received selecting the display for consuming the media content item. If input is not received, annotation engine 330 may select another annotation of the plurality of annotations. For example, the selected annotation might not grab the user's attention to select the media content item for consumption, in which case, another annotation may be preferred. In some such circumstances, annotation engine 330 may generate a display including a representation of the media content item and the new annotation to replace or add to the previously selected annotation.

In an illustrative example, annotation engine 330 identifies a plurality of media content items, and selects a respective annotation for each media content item of the plurality of media content items. Annotation engine 330 may generate a display including a plurality of representations corresponding to the plurality of media content items and each respective annotation. For example, annotation engine 330 may generate a list or array of thumbnails representations of a set of videos, and overlay a respective annotation on each thumbnail representation.

In an illustrative example, in the context of video, a primary function of annotation engine 330 is determining whether a generated annotation sufficiently represents the content of the video asset. In some embodiments, annotation engine 330 maps any changed entities in the generated annotation with the corresponding entities in the title. For example, referencing FIG. 1, annotation engine 330 may map 'Usain Bolt' to 'Roger Federer' and '10 hours' to' 12 hours'. Annotation engine 330 then evaluates the presence of each entity in the video. For example, Roger Federer is mentioned 5 times in the video and his picture is displayed for 2 minutes. Usain Bolt is mentioned 4 times and his picture is displayed for 1.5 minutes. If the presence of entities in annotation lies within some threshold of (e.g., some fraction of) the presence of the entities in title, annotation engine 330 may consider that the generated annotation sufficiently represents the video. Annotation engine 330 may consider, for example, parameters such as frequency of entity occurrence in video and audio, time of occurrence, combination of occurrence with other entities in the title, any other suitable parameter, or any combination thereof.

FIG. 4 shows generalized embodiments of an illustrative user device. User equipment system 401 may include set-top box 416 that includes, or is communicatively coupled to, display 412, audio equipment 414, and user input interface 410. In some embodiments, display 412 may include a television display or a computer display. In some embodiments, user input interface 410 is a remote-control device. Set-top box 416 may include one or more circuit boards. In some embodiments, the one or more circuit boards include processing circuitry, control circuitry, and storage (e.g., RAM, ROM, hard disk, removable disk, etc.). In some embodiments, circuit boards include an input/output path. Each one of user device 400 and user equipment system 401 may receive content and data via input/output (hereinafter "I/O") path 402. I/O path 402 may provide content and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing. While set-top box 416 is shown in FIG. 4 for illustration, any suitable computing device having processing circuitry, control circuitry, and storage may be used in accordance with the present disclosure. For example, set-top box 416 may be replaced by, or complemented by, a personal computer (e.g., a notebook, a laptop, a desktop), a network-based server hosting a user-accessible client device, a non-user-owned device, any other suitable device, or any combination thereof.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for an application stored in memory (e.g., storage 408). Specifically, control circuitry 404 may be instructed by the application to perform the functions discussed above and below. For example, the application may provide instructions to control circuitry 404 to generate the media guidance displays. In some implementations, any action performed by control circuitry 404 may be based on instructions received from the application.

In some client/server-based embodiments, control circuitry 404 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device such as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, for example, may be used to supplement storage 408 or instead of storage 408.

A user may send instructions to control circuitry 404 using user input interface 410. User input interface 410, display 412, or both may include a touchscreen configured to provide a display and receive haptic input. For example, the touchscreen may be configured to receive haptic input from a finger, a stylus, or both. In some embodiments, user device 400 may include a front-facing screen and a rear-facing screen, multiple front screens, or multiple angled screens. In some embodiments, user input interface 410 includes a remote-control device having one or more microphones, buttons, keypads, any other components configured to receive user input, or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 416.

Audio equipment 414 may be provided as integrated with other elements of each one of user device 400 and user equipment system 401 or may be stand-alone units. The audio component of videos and other content displayed on display 412 may be played through speakers of audio equipment 414. In some embodiments, the audio may be distributed to a receiver (not shown), which processes and outputs the audio via speakers of audio equipment 414. In some embodiments, for example, control circuitry 404 is configured to provide audio cues to a user, or other audio feedback to a user, using speakers of audio equipment 414. Audio equipment 414 may include a microphone configured to receive audio input such as voice commands and speech (e.g., including voice queries). For example, a user may speak letters or words that are received by the microphone and converted to text by control circuitry 404. In a further example, a user may voice commands that are received by the microphone and recognized by control circuitry 404.

An application (e.g., for accessing content) may be implemented using any suitable architecture. For example, a stand-alone application may be wholly implemented on each one of user device 400 and user equipment system 401. In some such embodiments, instructions for the application are stored locally (e.g., in storage 408), and data for use by the application is downloaded on a periodic basis (e.g., from an out-of-band feed, from an Internet resource, or using another suitable approach). Control circuitry 404 may retrieve instructions for the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the application is a client/server-based application. Data for use by a thick or thin client implemented on each one of user device 400 and user equipment system 401 is retrieved on demand by issuing requests to a server remote from each one of user device 400 and user equipment system 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on user device 400. This way, the processing of the instructions is performed remotely by the server while the resulting displays, which may include text, a keyboard, or other visuals, are provided locally on user device 400. User device 400 may receive inputs from the user via input interface 410 and transmit those inputs to the remote server for processing and generating the corresponding displays. For example, user device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to user device 400 for presentation to the user.

In some embodiments, the application is downloaded and interpreted or otherwise run by an interpreter or virtual machine (e.g., run by control circuitry 404). In some embodiments, the application may be encoded in the ETV Binary Interchange Format (EBIF), received by control circuitry 404 as part of a suitable feed, and interpreted by a user agent running on control circuitry 404. For example, the application may be an EBIF application. In some embodiments, the application may be defined by a series of JAVA-based files that are received and run by a local virtual machine or other suitable middleware executed by control circuitry 404.

FIG. 5 shows a block diagram of illustrative network arrangement 500 for generating annotations, in accordance with some embodiments of the present disclosure. Illustrative system 500 may be representative of circumstances in which a user searches for content on user device 550, views content on a display of user device 550, or both. In system 500, there may be more than one type of user device, but only one is shown in FIG. 5 to avoid overcomplicating the drawing. In addition, each user may utilize more than one type of user device and also more than one of each type of user device. User device 550 may be the same as user device 400 of FIG. 4, user equipment system 401, any other suitable device, or any combination thereof.

User device 550, illustrated as a wireless-enabled device, may be coupled to communications network 510 (e.g., connected to the Internet). For example, user device 550 is coupled to communications network 510 via a communications path (e.g., which may include an access point). In some embodiments, user device 550 may be a computing device coupled to communications network 510 via a wired connection. For example, user device 550 may also include wired connections to a LAN, or any other suitable communications link to network 510. Communications network 510 may be one or more networks including the Internet, a mobile phone network, mobile voice or data network (e.g., a 4G or LTE network), cable network, public switched telephone network, or other types of communications network or combinations of communications networks. Communications paths may include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user device 550 and network device 520, these devices may communicate directly with each other via communications paths, such as those described above, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Devices may also communicate with each other directly through an indirect path via communications network 510.

System 500, as illustrated, includes network device 520 (e.g., a server or other suitable computing device) coupled to communications network 510 via a suitable communications path. Communications between network device 520 and user device 550 may be exchanged over one or more communications paths (e.g., via communications network 510 as shown). Network device 520 may include a database, one or more applications (e.g., as an application server, host server). A plurality of network entities may exist and be in communication with network 510, but only one is shown in FIG. 5 to avoid overcomplicating the drawing. In some embodiments, network device 520 may include one source device. In some embodiments, network device 520 implements an application that communicates with instances of applications at many user devices (e.g., user device 550). For example, an instance of a social media application may be implemented on user device 550, with application information being communicated to and from network device 520, which may store profile information for the user (e.g., so that a current social media feed is available on other devices than user device 550). In a further example, an instance of a search application may be implemented on user device 550, with application information being communication to and from network device 520, which may store profile information for the user, search histories from a plurality of users, entity information (e.g., content and metadata), any other suitable information, or any combination thereof.

In some embodiments, network device 520 includes one or more types of stored information, including, for example, entity information, metadata, content, historical communications and search records, user preferences, user profile information, any other suitable information, or any combination thereof. Network device 520 may include an applications-hosting database or server, plug-ins, a software developers kit (SDK), an applications programming interface (API), or other software tools configured to provide software (e.g., as downloaded to a user device), run software remotely (e.g., hosting applications accessed by user devices), or otherwise provide applications support to applications of user device 550. In some embodiments, information from network device 520 is provided to user device 550 using a client/server approach. For example, user device 550 may pull information from a server, or a server may push information to user device 550. In some embodiments, an application client residing on user device 550 may initiate sessions with network device 520 to obtain information when needed (e.g., when data is out-of-date or when a user device receives a request from the user to receive data). In some embodiments, information may include user information (e.g., user profile information, user-created content). For example, the user information may include current and/or historical user activity information such as what content transactions the user engages in, searches the user has performed, content the user has consumed, whether the user interacts with a social network, any other suitable information, or any combination thereof. In some embodiments, the user information may identify patterns of a given user for a period of time. As illustrated, network device 520 includes entity information for a plurality of entities. Entity information 521, 522, and 523 include metadata for the respective entities. Entities for which metadata is stored in network device 520 may be linked to each other, may be referenced to each other, may be described by one or more tags in metadata, or a combination thereof.

In some embodiments, an application may be implemented on user device 550, network device 520, or both. For example, the application may be implemented as software or a set of executable instructions, which may be stored in storage of the user device 550, network device 520, or both and executed by control circuitry of the respective devices. In some embodiments, an application may include search functionality, audio and video playback functionality, recording functionality, or a combination thereof, that is implemented as a client/server-based application, where only a client application resides on user device 550, and a server application resides on a remote server (e.g., network device 520). For example, an application may be implemented partially as a client application on user device 550 (e.g., by control circuitry of user device 550) and partially on a remote server as a server application running on control circuitry of the remote server (e.g., control circuitry of network device 520). When executed by control circuitry of the remote server, the application may instruct the control circuitry to generate a display and transmit the generated display to user device 550. The server application may instruct the control circuitry of the remote device to transmit data for storage on user device 550. The client application may instruct control circuitry of the receiving user device to generate the application displays.

In some embodiments, the arrangement of system 500 is a cloud-based arrangement. The cloud provides access to services, such as information storage, searching, messaging, or social networking services, among other examples, as well as access to any content described above, for user devices. Services can be provided in the cloud through cloud-computing service providers, or through other providers of online services. For example, the cloud-based services can include a storage service, a sharing site, a social networking site, a search engine, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a social media application, a desktop application, or a mobile application, and may include an audio or video recording application, a playback application, a voice-recognition application and/or any combination of access applications of the same. User device 550 may be a cloud client that relies on cloud computing for application delivery, or user device 550 may have some functionality without access to cloud resources. For example, some applications running on user device 550 may be cloud applications (e.g., applications delivered as a service over the Internet), while other applications may be stored and run on user device 550. In some embodiments, user device 550 may receive information from multiple cloud resources simultaneously.

In an illustrative example, a user may access application 560, which may include a media content platform, configured to allowing searching, navigating, and consuming of media content items. Application 560 may access user profile information, and generate annotations associated with some, or all, of the media content items. Application 560 may display the annotations with respective representations of the media content items on a display device (e.g., a screen of user device 550). Application 560 may include any suitable functionality such as, for example, audio recording, video recording, speech recognition, speech-to-text conversion, text-to-speech conversion, query generation, search engine functionality, content retrieval, content streaming, display generation, content presentation, metadata generation, database functionality, or a combination thereof. In some embodiments, aspects of application 560 are implemented across more than one device. In some embodiments, application 560 is implemented on a single device. For example, entity information 521, 522, and 523 may be stored in memory storage of user device 550, and may be accessed by application 560.

FIG. 6 shows a flowchart of illustrative process 600 for generating an annotation, in accordance with some embodiments of the present disclosure. For example, an annotation application may perform process 600, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the annotation application may be an instance of application 560 of FIG. 5. In a further example, the annotation application may include the functionality of annotation engine 120 of FIG. 1, title processor 220 of FIG. 2, annotation generator 290 of FIG. 2, annotation engine 330 of FIG. 3, any other suitable functionality, or a combination thereof.

At step 602, the annotation application identifies a media content item. In some embodiments, the annotation application identifies the media content item at the time it is created, stored, uploaded, accessed, displayed, retrieved, at any other suitable time, or any combination thereof. For example, the annotation application may identify the media content item while generating a display of a representation of the media content item. In a further example, the annotation application may identify the media content item when it is uploaded or otherwise stored for subsequent access. In some embodiments, the annotation application identifies the media content item based on input received at an input interface. For example, a user may use a handheld remote or other interface device to input a command to the annotation application (e.g., selecting or highlighting the media content item). In some embodiments, the annotation application identifies the media content item among a plurality of media content items. For example, the annotation application may identify one or more media content items to generate a list or array of representations of the media content items. At step 602, the annotation application may identify the media content item, metadata associated with the media content item, title information of the media content item, a representation of the media content item, or a combination thereof.

At step 604, the annotation application determines a title corresponding to the media content item identified at step 602. In an illustrative example, the annotation application may include or otherwise be implemented as title processor 220 of FIG. 2, or any module thereof, that identifies a title associated with the identified media content item. In some embodiments, the annotation application identifies the title based on a metadata tag stored in metadata associated with the media content item. For example, a video clip or audio clip may have associated metadata with the tag type "title" and may include a text string corresponding to the title of the video or audio clip. In some embodiments, the annotation application may access the media content item and determine the title from the content of the media content item, a filename of the media content item, an index in which the media content item or link thereto is included, any other suitable information, or any combination thereof.

At step 606, the annotation application generates a title template based on the title and based on metadata associated with the media content item. To illustrate, the annotation application may include the functionality of title processor 220 of FIG. 2, or entity identifier 221, POS tagger 222, dependency parser 223, and template generator 224 thereof. In some embodiments, the annotation application identifies one or more entities included in the title. For example, the annotation application may include the functionality of entity identifier 221 of FIG. 2, and accordingly may be configured to identify one or more entities associated with the title. In some embodiments, the annotation application identifies keywords associated with entities such as, for example, words, phrases, names, places, channels, media asset titles, or other keywords, using any suitable criteria to identify keywords from title text. The annotation application may process words using any suitable word identification technique, pattern recognition technique, library reference, or any combination thereof. For example, the annotation application may compare a series of word or phrase templates to a portion of the text to find whether a match exists (e.g., whether a particular word or phrase is recognized). In a further example, the annotation application may apply a learning technique to better recognize words in title text. For example, the annotation application may gather title information for a plurality of media content items and accordingly use the information to determine the likely format, content, or context of the title. In some embodiments, at step 606, the annotation application adds detected words to a list of words detected in the title. In some embodiments, the annotation application may store these detected words in memory. For example, the annotation application may store in memory words as a collection of ASCII characters (i.e., 8-bit code), a pattern (e.g., indicating a reference used to match the word), an identifier (e.g., a code for a word), a string, any other datatype, or any combination thereof.

In some embodiments, at step 606, the annotation application identifies parts of speech of the title text (e.g., similar to POS tagger 222 of FIG. 2), dependencies of the title text based on determining a sequence or connection of parts of speech (e.g., similar to dependency parser 223 of FIG. 2), both. For example, the annotation application may identify one or more sequences of the identified parts of speech.

In some embodiments, at step 606, the annotation application compares text of the title text to a database that includes entity information (e.g., database 170 of FIG. 1, entity information 250 of FIG. 2, or a knowledge graph). For example, the database may include stored information associated with a plurality of entities, associated metadata, and other suitable information for linking entities. The annotation application may output a list of entities mapped to any, or each, word or phrase of the title text. In a further illustrative example, at step 606, the annotation application identifies one or more parts of speech among the plurality of words, identifies one or more entities based on the plurality of words, and determines a relationship among the one or more parts of speech and the one or more entities. The identified POS, entities, relationships, or a combination thereof are used to generate the title template (e.g., by specifying what types of words or patterns of words may be applicable to the template).

In some embodiments, at step 608, the annotation application generates an annotation based on the title template and based on user profile information. In some embodiments, the user profile information includes one or more keywords, and the annotation includes one or more words that correspond to the one or more keywords. In some embodiments, the annotation includes one or more keywords included in content associated with media content item, the metadata associated with the media content item, or both.

In some embodiments, at step 608, the annotation application identifies one or more entities based on user profile information. For example, the annotation application may identify one or more entities based on a user search history, user viewing/consumption history, user preferences, user interaction history with media content items, user connection on a social media network, or a combination thereof. In a further example, the annotation application may identify the entity based on popularity information associated with the entity (e.g., based on searches for a plurality of users). In some embodiments, the annotation application identifies the entity based on a user's preferences. For example, if one or more keywords match a preferred entity name or identifier of the user profile information, then the annotation application may identify that entity.

In some embodiments, at step 608, the annotation application identifies more than one entity (e.g., and associated metadata) among a plurality of entities based on the title text. In some embodiments, the annotation application identifies the entity by comparing at least a portion of the title text to tags of the stored metadata for each entity to identify a match.

In an illustrative example, the annotation application may compare words or phrases of the title text to nodes of an information graph (e.g., storing information and relationships among a large plurality of entities). For a title "Best Scenes of Tom Cruise," the annotation application identifies the words "scenes," "Tom," and "Cruise." The annotation application may identify matches for each word among nodes of the information graph. Nodes for which more than one word or phrase matches are weighted more heavily, or otherwise selected as the identified entity. For the above title, the list of nodes matching "Tom" and "Cruise" overlap at entity "Tom Cruise," which is associated with entity "actor," for example.

In some embodiments, at step 608, the annotation application generates a plurality of annotations based on the title template and updates the metadata associated with the media content item with the plurality of annotations. For example, the annotation application may select at least one annotation from the plurality of annotations to include as part of the display at step 610 based on user profile information.

At step 610, the annotation application generates for output to a display a representation of the media content item and the annotation. The annotation application may store, transmit, or both the annotation for storage in metadata. In some embodiments, the annotation application generates a page using html or any other suitable language to arrange text, video objects, control objects, and other objects. In some embodiments, the annotation application generates a display screen on a display device such as display 412 of FIG. 4.

In some embodiments, at step 610, the annotation application stores the title template, annotations, or both. The annotation application may store the annotations and title template in any suitable format. For example, the title template and annotations, along with any suitable metadata, may be stored as a data structure, a map, pickled data (e.g., stored as a binary file), text file (e.g., a comma separated value (CSV) file), any other suitable format, or any combination thereof. The annotation application may store the information on any suitable memory storage that may be included in a user device (e.g., a smartphone), network device (e.g., a server), a computer, any other computing device, or any combination thereof (e.g., distributed among any suitable number of devices). In an illustrative example, the annotation application may update the metadata associated with the media content item based on the title template, the annotation, or both. To further illustrate, the media content item may include a video, the representation of the media content item may include a thumbnail image associated with the video, and the annotation includes text. In some embodiments, the annotation application determines a position on the display to arrange the annotation. For example, the display may include the annotation overlaid on the representation of the media content item.

In some embodiments, at step 610, the annotation application determines whether the annotation represents the media content item based on one or more criteria. If it is determined that the annotation represents to the media content item, the annotation application generates the display.

FIG. 7 shows a flowchart of illustrative process 700 for generating and managing annotations, in accordance with some embodiments of the present disclosure. For example, an annotation application may perform process 700, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the annotation application may be an instance of application 560 of FIG. 5. In a further example, the annotation application may include the functionality of annotation engine 120 of FIG. 1, title processor 220 of FIG. 2, annotation generator 290 of FIG. 2, annotation engine 330 of FIG. 3, any other suitable functionality, or a combination thereof.

At step 702, the annotation application identifies one or more media contents items. In some embodiments, the annotation application identifies the one or more media content items at the time that each is created, stored, uploaded, accessed, displayed, retrieved, at any other suitable time, or any combination thereof. For example, the annotation application may identify each media content item while generating a display of a representation of the media content item. In a further example, the annotation application may identify the media content item when it is uploaded or otherwise stored for subsequent access. In some embodiments, the annotation application identifies each media content item based on input received at an input interface. For example, a user may use a handheld remote or other interface device to input a command to the annotation application (e.g., selecting or highlighting one or more media content items). In some embodiments, the annotation application identifies a plurality of media content items. For example, the annotation application may identify each of a plurality of media content items to generate a list or array of representations of the media content items. At step 702 (e.g., or optionally step 704), the annotation application may identify each media content item, metadata associated with each media content item, title information of each media content item, a representation of each media content item, or a combination thereof. In some embodiments, the annotation application determines a title corresponding to the media content item at step 702. In an illustrative example, the annotation application may include or otherwise be implemented as title processor 220 of FIG. 2, or any module thereof, that identifies the identified media content item by title. In some embodiments, the annotation application identifies the title based on a metadata tag stored in metadata associated with the media content item. For example, a video clip or audio clip may have associated metadata with the tag type "title" and may include a text string corresponding to the title of the video or audio clip. In some embodiments, the annotation application may access the media content item and determine the title from the content of the media content item, a filename of the media content item, an index in which the media content item or link thereto is included, any other suitable information, or any combination thereof.

At step 704, the annotation application generates one or more title templates. In some embodiments, the annotation application retrieves one or more reference templates and determines which reference template best matches the identified title information (e.g., the title). For example, the annotation application may include any of the functionality of template generator 224 of FIG. 2 to generate one or more title templates based on analysis of the title by entity identifier 221, POS tagger 222, and dependency parser 223, a reference template (e.g., from reference information 270), historical information (e.g., previous templates, typical title formats, or other information from reference information 270), or a combination thereof. To illustrate in the context of a video, the annotation application processes the title of the video and creates a template from the title. In some embodiments, the annotation application generates the title template and stores the title template as part of metadata. In some embodiments, annotation application generates the title template and stores the title template in reference information (e.g., linked to the media content item). In some embodiments, the annotation application retrieves one or more reference title templates from reference information, and selects among the reference title templates to generate the title template.

At step 751, the annotation application identifies one or more parts of speech of words included in the title. At step 752, the annotation application identifies one or more entities associated with the title. At step 753, the annotation application identifies dependency information associated with the title. In an illustrative example, the annotation application may include the functionality of title processor 220, which analyzes the title using any suitable NLP tools such as a POS tagger (e.g., implemented at step 751) and a Dependency parser (e.g., implemented at step 751) to extract details from the title and create the title template at step 704.

At step 705, the annotation application stores the one or more title templates in storage (e.g., as part of metadata 790). The title templates may include parts of speech, types, a sequence thereof, or any suitable combination thereof. In some embodiments, the title template may be stored as text (e.g., words, alphanumeric symbols, or both). In an illustrative example, the title template may be implemented as an abstract class which may be instantiated based on the specifics of the title template. In a further illustrative example, the title template may include a sequence of words or codes that are linked to a library of known types, words, entities, alternatives, or a combination thereof that may be populated during annotation generation (e.g., at step 706).

At step 706, the annotation application generates one or more annotations based on the one or more title templates of step 704 and information of user profile information 780. The annotation application may populate the title template with words from the content, associated metadata, or both to generate the annotation.

At step 707, the annotation application determines whether the one or more annotations generated at step 706 are relevant. In some embodiments, the annotation application compares each of the one or more annotations to the title and if a sufficient number of features match, the annotation is deemed relevant. In some embodiments, annotation application may determine that the existing title is more relevant to the user than the annotation and accordingly may determine not to select an annotation.

At step 708, the annotation application retrieves information from user profile information 780. User profile information 780 may be, but need not be, implemented on separate or different hardware from the control circuitry on which the annotation application is implemented.

At step 710, the annotation application selects one or more annotations associated with a media content item. For example, the annotation application may include any functionality of annotation engine 330 of FIG. 3, which is configured to select at least one annotation from the plurality annotations based on user profile information. For example, the annotation application may be configured to identify an entity which may be of interest to the user and select an annotation that is most closely relevant to the identified entity. In some embodiments, at step 710, the user profile information includes one or more keywords, and the selected at least one annotation includes one or more words that correspond to the one or more keywords.

Accordingly, the annotation application may select the at least one annotation from the plurality of annotations by comparing the one or more keywords to the one or more words. For example, the at least one annotation may include one or more keywords included in content associated with media content item, metadata associated with the media content item, or both. In some embodiments, the user profile information includes a viewing history associated with the user, user preferences, one or more other users that the user is linked to, and user recommendations. In some embodiments, the annotation application selects the at least one annotation from the plurality of annotations based on keywords. For example, the annotation application may identify one or more keywords from the information of the user profile information, and identify one or more words of the plurality of annotations. The annotation application may then compare the one or more keywords and the one or more words to determine which of the plurality of annotations match the one or more keywords.

At step 712, the annotation application generates output, which may include, for example, a display including a thumbnail representation, an overlay, and a display arrangement. In some embodiments, the annotation application may store the selected annotation, or an indicator that the annotation was selected in metadata associated (e.g., linked) with the media content item. At step 755, the annotation application determines a thumbnail representation corresponding to the media content item. At step 756, the annotation application generates an overlay corresponding to the annotation over the thumbnail representation of step 755. At step 757, the annotation application determines a location of the overlay of step 756.

FIG. 8 shows a flowchart of illustrative process 800 for selecting an annotation, in accordance with some embodiments of the present disclosure. For example, an annotation application may perform process 800, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the annotation application may be an instance of application 560 of FIG. 5. In some embodiments, the query application performs process 800 as part of step 612 of process 600.

FIG. 8 shows a flowchart of illustrative process 800 for selecting an annotation, in accordance with some embodiments of the present disclosure. For example, an annotation application may perform process 800, implemented on any suitable hardware such as user device 400 of FIG. 4, user equipment system 401 of FIG. 4, user device 550 of FIG. 5, network device 520 of FIG. 5, any other suitable device, or any combination thereof. In a further example, the annotation application may be an instance of application 560 of FIG. 5. In a further example, the annotation application may include the functionality of annotation engine 120 of FIG. 1, title processor 220 of FIG. 2, annotation generator 290 of FIG. 2, annotation engine 330 of FIG. 3, any other suitable functionality, or a combination thereof. For example, the annotation application may select the annotation from a plurality of annotations generated using process 600 of FIG. 6 or process 700 of FIG. 7.

At step 802, the annotation application identifies a media content item. In some embodiments, the annotation application identifies the media content item at the time it is created, stored, uploaded, accessed, displayed, retrieved, at any other suitable time, or any combination thereof. For example, the annotation application may identify the media content item while generating a display of a representation of the media content item. In a further example, the annotation application may identify the media content item when it is uploaded or otherwise stored for subsequent access. In some embodiments, the annotation application identifies the media content item based on input received at an input interface. For example, a user may use a handheld remote or other interface device to input a command to the annotation application (e.g., selecting or highlighting the media content item). In some embodiments, the annotation application identifies the media content item among a plurality of media content items. For example, the annotation application may identify one or more media content items to generate a list or array of representations of the media content items. At step 802, the annotation application may identify the media content item, metadata associated with the media content item, title information of the media content item, a representation of the media content item, or a combination thereof.

At step 804, the annotation application identifies a user entity (e.g., a user). The user entity may be associated with the display device, the control circuitry, a hardware address (e.g., a MAC address), a software address (e.g., and IP address), an account (e.g., a user account currently logged into), any other suitable user entity for which user profile information may be available, or any combination thereof. In some embodiments, at steps 802 and 804, the annotation application identifies the user entity by identifying a user associated with the display device and then receiving input at an input device identifying the media content item.

In some embodiments, steps 802 and 804 may be combined. For example, the annotation application may identify a media content item and a user entity associated with user profile information.

At step 806, the annotation application identifies a plurality of annotations stored in metadata associated with the media content item. In some embodiments, the plurality of annotations are based on content and a title of the media content item, and are generated from a title template. In an illustrative example, the annotation application may implement, be included in, or include annotation engine 330 of FIG. 3 and accordingly, be configured to retrieve, recall, or otherwise accesses annotations. For example, the annotation application may first identify the media content item, and then identify annotations stored in metadata that is associated with the media content item. In some embodiments, annotation 323 is generated for output on a display device (e.g., as an overlay on a representation of media content item 310). In an illustrative example, the media content item may include a video, the representation of the media content item may include a thumbnail image associated with the video, and selected annotation, or annotations, may include text.

At step 808, the annotation application selects at least one annotation from the plurality of annotations based on user profile information linked to the user entity. To illustrate, the annotation application, which may include functionality of annotation engine 330 of FIG. 3, is configured to select at least one annotation from the plurality annotations based on user profile information. For example, the annotation application may be configured to identify a user entity which may be of interest to the user (e.g., based on user profile information) and select an annotation that is most closely relevant to the identified user entity (e.g., directly references the user entity, shares common aspects with the user entity).

In some embodiments, at step 808, the user profile information includes one or more keywords, and the selected at least one annotation includes one or more words that correspond to the one or more keywords. Accordingly, the annotation application may select the at least one annotation from the plurality of annotations by comparing the one or more keywords to the one or more words. For example, the at least one annotation may include one or more keywords included in content associated with media content item, metadata associated with the media content item, or both. In some embodiments, the user profile information includes a viewing history associated with the user entity (e.g., the user in this context), user preferences, one or more other entities the user is linked to, and user recommendations. In some embodiments, the annotation application selects the at least one annotation from the plurality of annotations based on keywords. For example, the annotation application may identify one or more keywords from the information of the user profile information, and identify one or more words of the plurality of annotations. The annotation application may then compare the one or more keywords and the one or more words to determine which of the plurality of annotations match the one or more keywords.

At step 810, the annotation application generates for output to a display a representation of the media content item and the at least one annotation selected at step 808. In some embodiments, for example, the annotation application determines a position on the display to arrange each of the at least one annotation, and the display includes the at least one annotation overlaid on the representation of the media content item In an illustrative example, the annotation application may select an annotation that does not sufficiently garner the user's attention to cause consumption of the media content item. In some embodiments, the annotation application determines whether input is received selecting the display for consuming the media content item. If that input is not received, the annotation application may select another annotation of the plurality of annotations that is different from at least one of the at least one annotation. The annotation application may then generate for output (e.g., on a display device) a display including a representation of the media content item and the at least one annotation, or otherwise update the display to include the newly selected annotation.

In a further illustrative example, the annotation application may identify a plurality of media content items at step 802. The annotation application may then select a respective annotation from the plurality of annotations for each media content item of the plurality of media content items. The annotation application may then generate for output (e.g., on a display device) a display including a plurality of representations corresponding to the plurality of media content items and each respective annotation. To illustrate, process 800 may be performed for one media content item, or a more than one media content item. For the above examples of FIGS. 6-8, the systems and devices of FIG. 3-5 can implement or be configured to implement the methods and techniques described herein.

It should be noted that the above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    identifying a media content item;
    determining a title corresponding to the media content item, wherein the title includes a plurality of words;
    identifying one or more parts of speech among the plurality of words based on a neural network model;
    accessing text from a closed caption annotation for the media content item;
    identifying, utilizing a knowledge graph including linked entity information, one or more entities based on the plurality of words;
    determining a relationship among the one or more parts of speech and the one or more entities identified utilizing the knowledge graph;
    generating an overlay based on the identified one or more parts of speech among the plurality of words based on the neural network model, and the text from the closed caption annotation for the media content item, the one or more entities based on the plurality of words, and the relationship among the one or more parts of speech and the one or more entities identified utilizing the knowledge graph, wherein the overlay includes a selectable link to the media content item; and generating for output on a display device a representation of the media content item and the overlay.

2. The method of claim 1, comprising updating metadata associated with the media content item based on the overlay.

3. The method of claim 1, wherein the overlay comprises one or more keywords included in content associated with media content item, or metadata associated with the media content item.

4. The method of claim 1, comprising accessing user profile information, wherein the generating of the overlay is based on the text from the closed caption annotation for the media content item, and the user profile information, wherein the user profile information comprises one or more keywords, and wherein the overlay comprises one or more words that correspond to the one or more keywords.

5. The method of claim 1, wherein the generating of the overlay comprises:
generating a plurality of overlays based on the text from the closed caption annotation for the media content item;
updating metadata associated with the media content item with the plurality of overlays; and
selecting at least one overlay from the plurality of overlays for output on the display device based on user profile information.

6. The method of claim 1, wherein the media content item comprises a video, wherein the representation of the media content item comprises a thumbnail image associated with the video, and wherein the overlay comprises text.

7. The method of claim 1, comprising determining a position on the display device to arrange the overlay, wherein the generating for output on the display device the representation of the media content item and the overlay includes positioning the overlay on the representation of the media content item at the determined position.

8. The method of claim 1, comprising:
determining whether the overlay represents the media content item based on at least one of a frequency of an entity occurrence in the media content item, or a time of an entity occurrence in the media content item; and
in response to determining that the overlay represents the media content item based on the at least one of the frequency of the entity occurrence in the media content item, or the time of the entity occurrence in the media content item, performing the generating for output on the display device the representation of the media content item and the overlay.

9. The method of claim 1, wherein the generating for output on the display device the representation of the media content item and the overlay comprises:
generating for output on the display device an interface including the representation of the media content item and at least one of:
the closed caption annotation,
a description of the media content item,
information about an entity that posted the media content item,
a period of time corresponding to a time since the media content item was posted, or
a number of times the media content item was viewed.

10. A system comprising:
circuitry configured to:
identify a media content item;
determine a title corresponding to the media content item, wherein the title includes a plurality of words;
identify one or more parts of speech among the plurality of words based on a neural network model;
access text from a closed caption annotation for the media content item;
identify, utilizing a knowledge graph including linked entity information, one or more entities based on the plurality of words;
determine a relationship among the one or more parts of speech and the one or more entities identified utilizing the knowledge graph;
generate an overlay based on the identified one or more parts of speech among the plurality of words based on the neural network model, and the text from the closed caption annotation for the media content item, the one or more entities based on the plurality of words, and the relationship among the one or more parts of speech and the one or more entities identified utilizing the knowledge graph, wherein the overlay includes a selectable link to the media content item; and
generate for output on a display device a representation of the media content item and the overlay.

11. The system of claim 10, wherein the circuitry is configured to update metadata associated with the media content item based on the overlay.

12. The system of claim 10, wherein the overlay comprises one or more keywords included in content associated with media content item, or metadata associated with the media content item.

13. The system of claim 10, wherein the circuitry is configured to access user profile information, and generate the overlay based on the text from the closed caption annotation for the media content item, and the user profile information, wherein the user profile information comprises one or more keywords, and wherein the overlay comprises one or more words that correspond to the one or more keywords.

14. The system of claim 10, wherein the circuitry configured to generate the overlay is configured to:
generate a plurality of overlays based on the text from the closed caption annotation for the media content item;
update metadata associated with the media content item with the plurality of overlays; and
select at least one overlay from the plurality of overlays for output on the display device based on user profile information.

15. The system of claim 10, wherein the media content item comprises a video, wherein the representation of the media content item comprises a thumbnail image associated with the video, and wherein the overlay comprises text.

16. The system of claim 10, wherein the circuitry is configured to determine a position on the display device to arrange the overlay, and wherein the circuitry configured to generate for output on the display device the representation of the media content item and the overlay is configured to position the overlay on the representation of the media content item at the determined position.

17. The system of claim 10, wherein the circuitry is configured to:
determine whether the overlay represents the media content item based on at least one of a frequency of an entity occurrence in the media content item, or a time of an entity occurrence in the media content item; and
in response to determining that the overlay represents the media content item based on the at least one of the frequency of the entity occurrence in the media content item, or the time of the entity occurrence in the media content item, perform the generating for output on the display device the representation of the media content item and the overlay.

18. The system of claim 10, wherein the circuitry configured to generate for output on the display device the representation of the media content item and the overlay is configured to:
generate for output on the display device an interface including the representation of the media content item and at least one of:
the closed caption annotation,
a description of the media content item,
information about an entity that posted the media content item,
a period of time corresponding to a time since the media content item was posted, or
a number of times the media content item was viewed.

* * * * *